(12) United States Patent
Adair

(10) Patent No.: US 7,052,032 B1
(45) Date of Patent: May 30, 2006

(54) PIVOTABLE ANTI SWAY TRAILER HITCH

(76) Inventor: Edward C. Adair, 6503 Holly Ridge Ct., Fredericksburg, VA (US) 22407

( * ) Notice: Subject to any disclaimer, the term of this patent is extended or adjusted under 35 U.S.C. 154(b) by 0 days.

(21) Appl. No.: 10/775,740

(22) Filed: Feb. 9, 2004

Related U.S. Application Data

(60) Provisional application No. 60/449,353, filed on Feb. 24, 2003.

(51) Int. Cl.
*B60D 1/155* (2006.01)
*B60D 1/36* (2006.01)

(52) U.S. Cl. .................. 280/479.3; 280/491.3

(58) Field of Classification Search ......... 280/478.1, 280/479.2, 479.3, 480.1, 491.3, 491.5, 482, 280/491.2, 491.1
See application file for complete search history.

(56) References Cited

U.S. PATENT DOCUMENTS

| | | | |
|---|---|---|---|
| 4,807,900 A | 2/1989 | Tate | |
| 4,951,957 A | 8/1990 | Gullickson | |
| 5,288,095 A * | 2/1994 | Swindall | 280/479.2 |
| 5,322,315 A * | 6/1994 | Carsten | 280/479.2 |
| 5,547,210 A | 8/1996 | Dugger | |
| 5,580,088 A * | 12/1996 | Griffith | 280/479.2 |
| 5,593,171 A * | 1/1997 | Shields | 280/479.2 |
| 5,727,805 A * | 3/1998 | La Roque | 280/478.1 |
| 6,068,281 A * | 5/2000 | Szczypski | 280/479.2 |
| 6,527,292 B1 | 3/2003 | Adair | |
| 6,729,637 B1 * | 5/2004 | Wolters et al. | 280/491.3 |

* cited by examiner

*Primary Examiner*—Anne Marie Boehler

(57) ABSTRACT

A trailer hitch assembly that can be extended and turned from side to side to facilitate hookup of a vehicle to be towed and that can when not in use be stowed out of the way without removal from the towing vehicle is shown. The hitch assembly also serves to control fish tailing of a towed vehicle.

6 Claims, 4 Drawing Sheets

PIVOTABLE ANTI SWAY TRAILER HITCH

This invention relates to trailer hitches and more particularly to a method and means for pivoting a hitch receiver with a slidably extendable ball mount member mounted therein from a stored position to a trailer hitch engaging position and thence to towing position

BACKGROUND OF INVENTION

Trailer hitches conventionally have been mounted to the frames of vehicles at the rear adjacent the bumper. Typically they have consisted of an elongated hollow hitch receiver mounted on the vehicle and a ball mount member adapted to be selectively inserted into the receiver and secured with the towing ball extending rearward in operative position. With no trailer attached the ball mount has presented a hazard to persons passing the rear of the vehicle and accordingly the ball mount is usually detached when not in use. Once removed the ball mount must be stowed inside the vehicle or risk loss and/or unavailability when needed. When stored in the vehicle the ball mount frequently becomes a deadly missile in the event of an accident. Further when hitching up a laterally fixed ball mount member requires accurate positioning of the towing vehicle and the trailer.

PRIOR ART

Various attempts have been made to provide a ball mount that can be rotated from a towing position to a retracted position such as shown in U.S. Pat. No. 4,807,900 to Tate in which he provides a horizontal rotatable draw plate carrying a ball. None of the art has addressed the pivoting of the conventional hitch receiver with a removable ball mount member mounted therein from an operating extended position to a retracted stored position as shown herein. Various attempts have been made to provide a pivoted and extendible ball mount member to facilitate hitching up. Included in this category are U.S. Pat. No. 5,322,315 to Carsten; U.S. Pat. No. 4,951,957 to Gullickson; U.S. Pat. No. 5,547,210 to Dugger. My U.S. Pat. No. 6,527,292 issued Mar. 4, 2003 addressed the first part of the above problems and this application is in part an improvement of my said patent and is based in part on my Provisional Application 60/449,353 filed Feb. 24, 2003.

OBJECTS AND SUMMARY OF INVENTION

Accordingly it is an object of the present invention to provide a pivotally mounted hitch receiver for standard ball mount tow bars that can be easily moved from towing position to stored position with an easily extendable ball mount member to facilitate hitching up.

It is another object of the present invention to provide a pivotally mounted hitch receiver capable of safely engaging large size tow bars such as classes 3, 4, 5, and larger.

It is a further object of the present invention to provide a hitch receiver for classes 3, 4, 5 and larger with an extendable ball mount member that may be easily moved from stored position to hitching up position to towing position with complete safety.

It is a still further object of the present invention to provide class 4, 5 or larger hitch receiver that is simple and economical to manufacture, safe and easy to use, and in stowage mode positions a ball mount in a fully retracted position so that it can not be contacted accidentally by a person's legs as they walk behind a vehicle.

These and other and further objects are accomplished in an embodiment of the present invention in which a hitch receiver is hingedly mounted between a pair of horizontal plates for pivotal movement from a rearward facing position to a side facing position.

DESCRIPTION OF A PREFERRED EMBODIMENT

Figure 1:
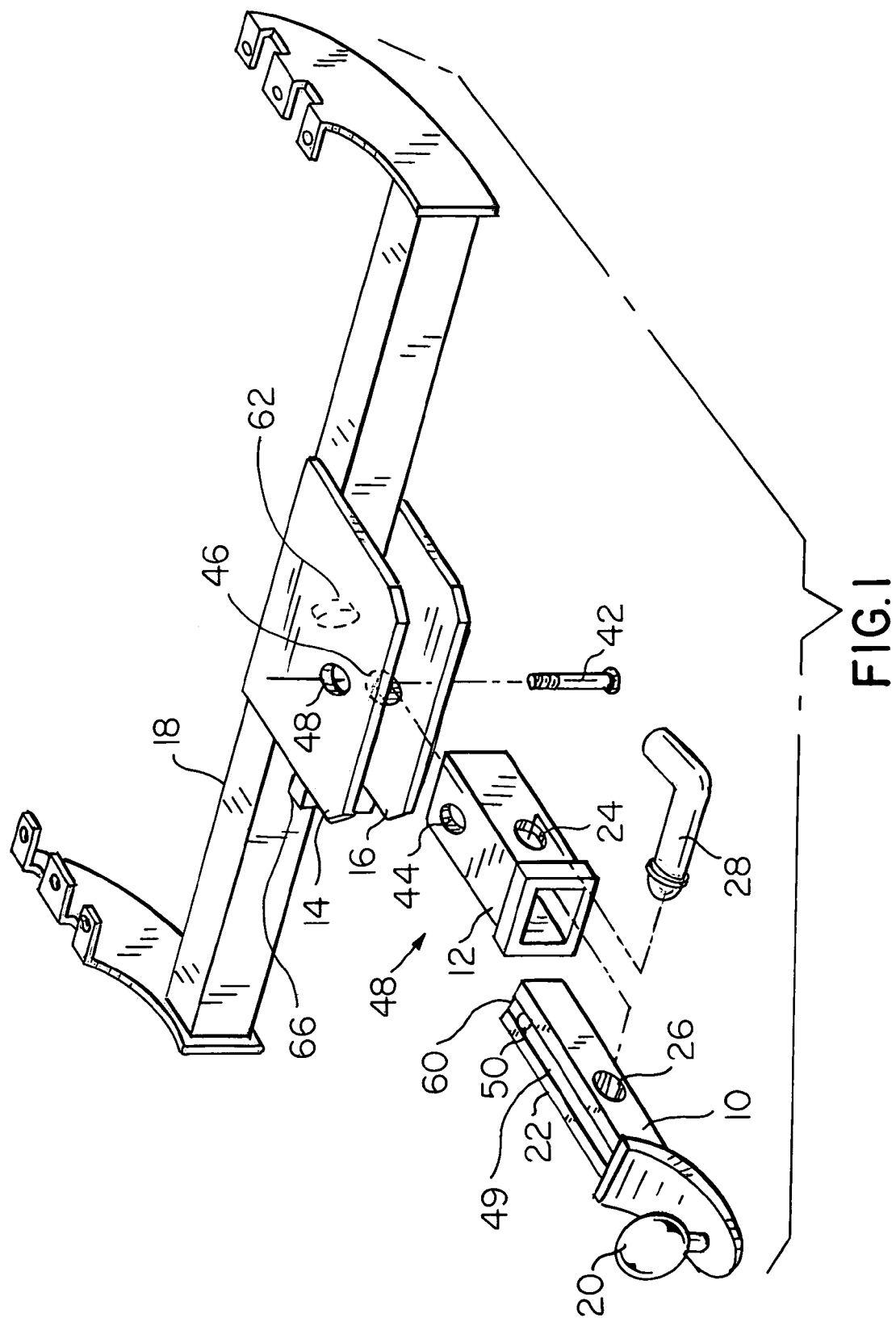
FIG. 1 is an exploded perspective view of a hitch receiver and ball mount member according to the present invention.

Referring now to FIG. 1 there is shown an exploded view of a ball mount 10 positioned in a hitch receiver 12 mounted between plates 14 and 16 on a frame member 18 adapted to be installed on the underside of a pickup truck or other vehicle. Ball mount 10 carries the usual hitch ball 20 on its outer end and the bar member 22 of the ball mount is sized to telescopically fit within receiver 12. A pair of transverse holes 24 are provided in the sides of receiver 12 and a corresponding hole 26 in bar member 22 is provided adjacent the outer end of ball mount 10. The holes 24 and 26 are position so as to align when the ball mount 10 is in operative or stored position within receiver 12. A linchpin 28 is inserted through the assembled ball mount and receiver to secure same for towing or storage in the retracted position A suitable lock (not shown) may be provided to keep linchpin 28 in proper position Receiver 12 is pivotally mounted between plates 14 & 16 by a vertical bolt 42 and corresponding holes 44 in the top and bottom of receiver 12. This allows receiver 12 to pivot freely between plates 14 & 16 from left to right as necessary to position the ball mount in hitching-up position with the trailer to be towed. Bolt 42 is threaded on the end and inserted from underneath plate 16 through a hole 46 into a threaded hole 48 in top plate 14

Figure 2:
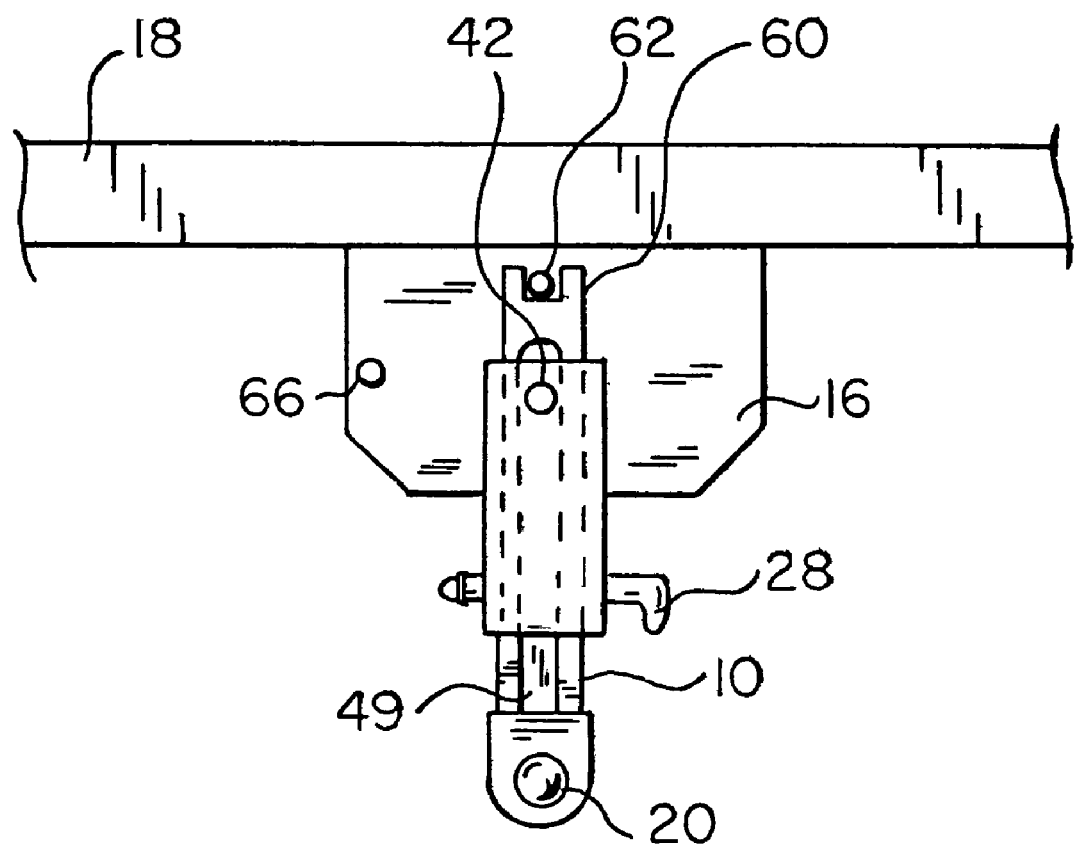
FIG. 2 is a top plan view of the apparatus of FIG. 1 with the top plate removed and shown in the locked towing position.

Ball mount member 10 has formed therein a longitudinal slot 49 extending from adjacent the outer end to adjacent the distal end. Bolt 42 is fed through this slot to allow the ball mount bar member 22 to telescope into and out of the receiver 12. A stop limit bar 50 is formed at the distal end of ball member 10 closing slot 49 in bar 22 to prevent the complete removal of the member 10 from the receiver 12 without first removing bolt 42. A recess or fork 60 is formed in the distal end of ball mount member so as to engage an aligning and locking bolt or stud 62 fixed to plates 14 and 16 so that when the ball mount member 10 is retracted into receiver 12 the stud 62 fits into the recess 60 to align the ball mount and receiver in towing position (see FIG. 2). In this position holes 24 in the receiver and holes 26 in the ball mount are aligned. A pin 28 inserted in the aligned holes thus locks the ball mount and receiver in towing position after the desired trailer has been hitched up.

Figure 3:
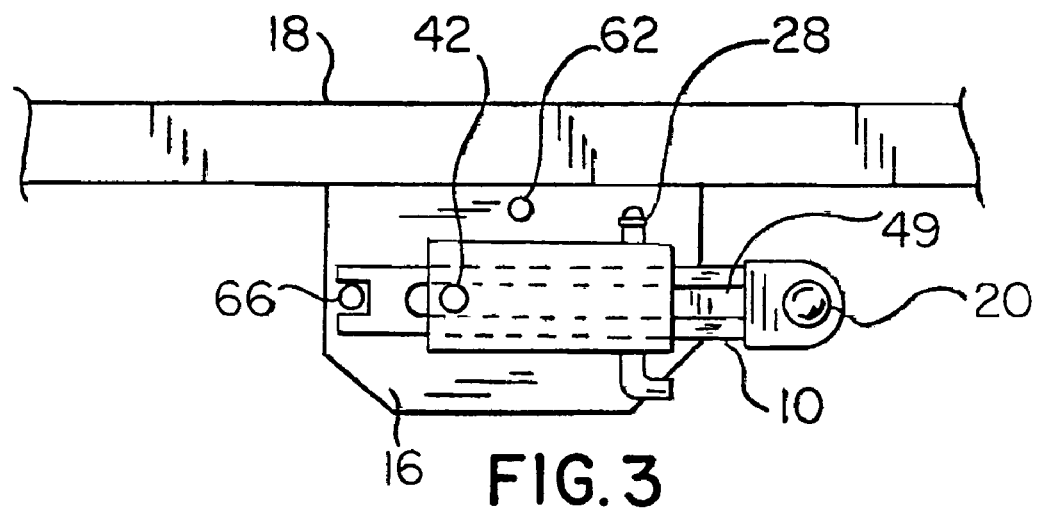
FIG. 3 is a view similar to FIG. 2 showing the hitch in the stowed position.

Similarly a second bolt or stud 66 is fixed on the left side of plates 14 and 16 in FIG. 1. As shown in FIG. 3 when it is desired to store the hitch assembly out of the way in the retracted position pin 28 is removed and the ball mount member is withdrawn slightly and the assembly rotated to the right until the ball mount is retracted out of the way under the bumper or body of the towing vehicle. Ball mount member is then inserted all the way into the receiver 12 so that recess 60 engages about stud 66 to hold the assembly in the retracted position. Installation of pin 28 in aligned holes 24 and 26 then locks the hitch assembly in the retracted and stored position.

Figure 4:
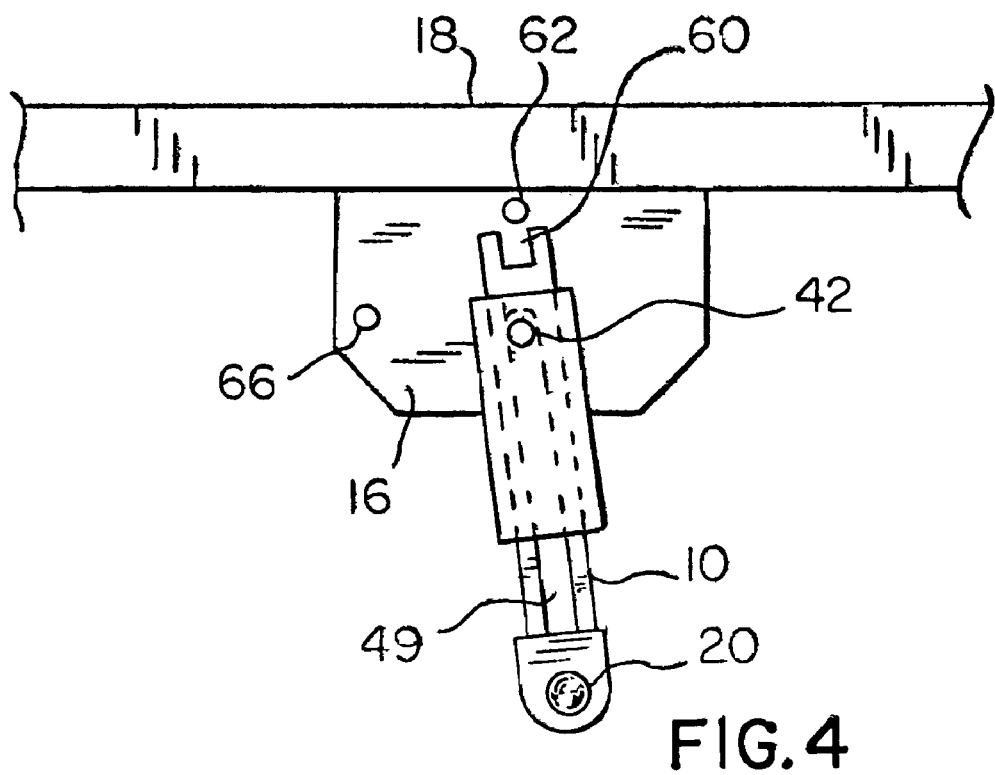
FIG. 4 is a view similar to FIGS. 2 & 3 showing the hitch in the extended, pivoting position for hitching up.

As shown in FIG. 4 for hitching-up purposes the pin 28 is removed and the ball mount withdrawn and with the receiver rotated to the appropriate position for receiving the trailed hitch member. It thus is not necessary to perfectly align the towing vehicle and the trailer in order to hitch up. Once the trailer is engaged the vehicle pulls ahead to align the two vehicles and then backs up until the ball mount engages stud 62. The assembly may be locked up in towing configuration by inserting pin 28 in the appropriate holes 24 and 26.

Figure 5:
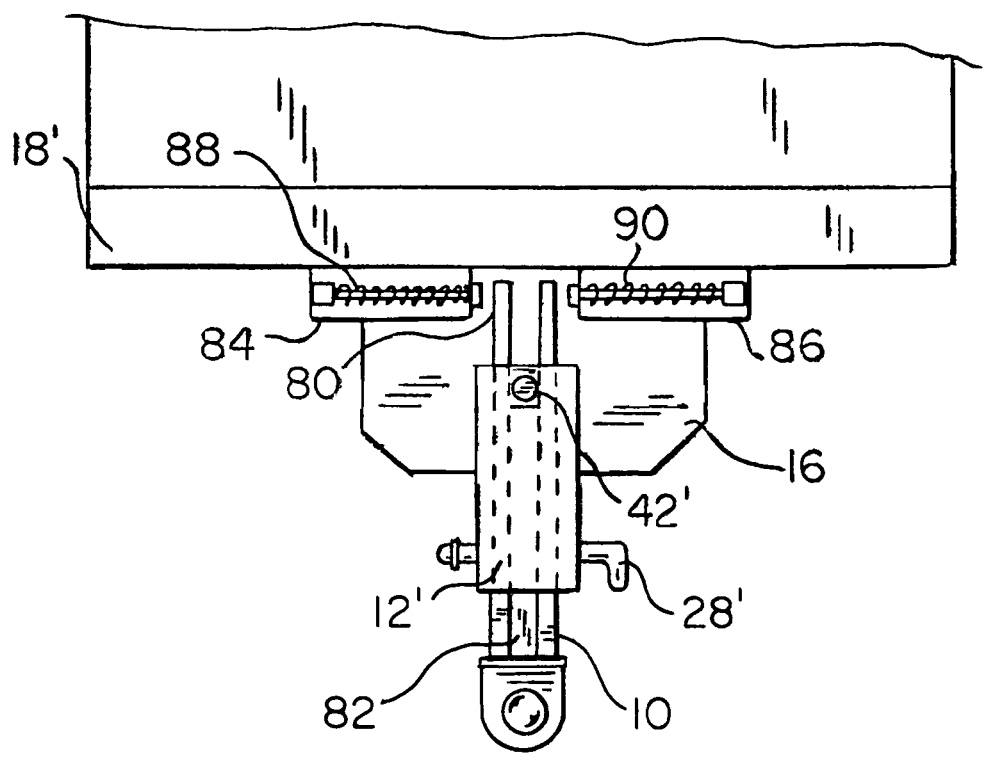
FIG. 5 is a view similar to FIG. 2 of another embodiment of the present invention.

Referring now to FIG. 5 ball mount member 10' is telescoped into receiver 12'. Receiver 12' is pivotally mounted between the lower plate 16' and the top plate 14, (not shown for clarity) by a bolt 42'. Ball mount member 10' is formed with an open fork end 80 opposite the ball end and a groove 82 extending from adjacent the fork end 80 to adjacent the ball end. Fork end 80 has a length sufficient to allow the end of ball mount member 10' to extend past pin 42' almost to the frame member 18' when inserted into receiver 12' to the full retracted and towing position. A pin not shown is fixed on top plate to engage in groove 82 to prevent unwanted disassembly of ball mount 10' from receiver 12'. Pin 28' inserted in holes 24' and 26' maintains ball mount member 10' in receiver 12' in a similar manner as shown in FIG. 1.

Mounted on either side of the front end (relative to the towing vehicle) of ball mount member 10' on frame member 18' are a pair of sensor members 84 and 86. Members 84 and 86 are spaced apart sufficiently to allow a little pivotal movement of the fork end of the ball mount member 10' when the towed vehicle starts to fish tail. Housings 84 and 86 serve as stops to limit travel of the fork end and have mounted therein a normally open switch member 88 and 90 respectively.

Figure 6:
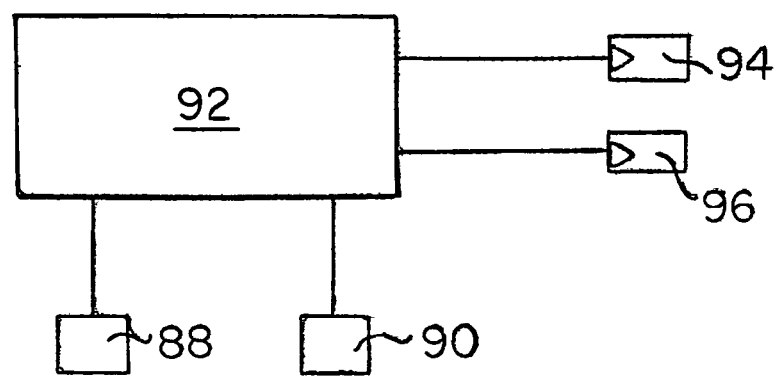
FIG. 6 is a block diagram of a control system for the apparatus of FIG. 5.

Switches 88 and 90 are connected to a controller 92 as shown in FIG. 6. Controller 92 is also connected via the usual trailer connectors to the brake actuating solenoids 94 and 96 of the usual electric brake members of most trailers.

In operation when the ball mount member 10' is locked in towing position, as the towed vehicle starts to the right for instance in FIG. 5, the ball mount member 10' will be pivoted clockwise until switch 90 is actuated. Further pivoting is limited by housing 86. If the towed vehicle is fishtailing the above movements will quickly be reversed and ball mount member 10' will actuate switch 88. An adjustable timing circuit in controller 92 monitors the time between signals from switches 88 and 90 and if they are occurring within a preset period of time controller 92 will cause one or both brake solenoids 94 and 96 to be actuated to slow the towed vehicle and allow the towing vehicle to straighten out the fish tailing action.

When not being used to tow a vehicle ball mount member 10' is pivoted to the right in FIG. 5 and the fork end 80 engaged about pin 98 and pin 28' inserted in the usual holes to fix the hitch assembly in the retracted position similar to that shown in FIG. 3.

In both embodiments of FIGS. 1 & 5 the hitch may be locked in either operative or stowed position by simple insertion of the traditional linch pin, common in trailer hitches. into the aligned holes of the receiver and ball mount members. This allows a simpler and more economical construction and results in a hitch assembly that is complete and available for instant use even when stored out of the way under the bumper of the towing vehicle.

While there are given above certain specific examples of this invention and its application in practical use, it should be understood that they are not intended to be exhaustive or to be limiting of the invention. On the contrary, these illustrations and explanations herein are given in order to acquaint others skilled in the art with this invention and the principles thereof and a suitable manner of its application in practical use, so that others skilled in the art may be enabled to modify the invention and to adapt and apply it in numerous forms each as may be best suited to the requirement of a particular use.

I claim:

1. In a trailer hitch apparatus for mounting on a towing vehicle to be coupled to a vehicle to be towed, a combination recessed storage and pivoting hook up receiver and ball mount assembly comprising:

a first frame member adapted to be mounted to the lower rear frame of a towing vehicle having upper and lower surfaces;

a bottom plate fixed to said frame member;

a top plate fixed to said frame member spaced apart from said bottom plate;

a hollow tubular hitch receiver member pivotally mounted between said bottom and top plates and having open front and rear ends;

said tubular hitch member being mounted so as to be pivotable through substantially one hundred eighty degrees from left side to right side of the towing vehicle;

a ball mount member having front and rear ends, telescopically mounted in said tubular hitch receiver member and having a body portion longer than the length of said receiver member and a hitch ball mounted on the rear end thereof;

said ball mount member and receiver member each having cooperating latching means for securing said ball mount member in a selected position in said receiver member;

towing index means and stowing index means mounted between said top and bottom plates; and index receiving means formed on the front end of said ball mount member opposite said hitch ball end adapted to selectively cooperatively engage with said towing or stowing index means;

whereby in the unlatched condition said ball mount member may be rotated left to right and telescoped in and out of said receiver member to facilitate attaching to the vehicle to be towed and then secured either in towing or stowing condition by actuation of said ball mount member and receiver member latching means.

2. The apparatus as claimed in claim 1 wherein said towing and stowing index means comprise a threaded bolt inserted vertically through said top and bottom plates; and said stowing index means is positioned so that when said index receiving means on the front end of said ball mount member is engaged therewith said receiver and ball mount members are recessed under the rear end of the towing vehicle.

3. The apparatus as claimed in claim 2 wherein said cooperating latching means includes a linch pin inserted in aligned holes in said tubular hitch receiver and ball mount members respectively to lock them together.

4. The apparatus as claimed in claim 1 wherein said tubular hitch member with said ball mount member positioned therein pivots a total of one hundred fifty degrees from left to right to facilitate easy hitching up of a vehicle to be towed.

5. In a trailer hitch apparatus for mounting on a towing vehicle to be coupled to a vehicle to be towed, a combination recessed storage, telescoping, and pivoting hook up receiver and ball mount assembly, that may be selectively positioned in operating hitch-up, towing, or stowage condition by use of a single linch pin comprising:

a hollow tubular hitch receiver member pivotally mounted on the rear of a towing vehicle for left to right movement of substantially one hundred eighty degrees;

a ball mount member, having forward and rearward ends, telescopically mounted in said tubular hitch receiver having a length greater than said hitch receiver and carrying on the rearward end thereof a hitch ball;

said ball mount member having on the forward end index engaging means;

towing index means and stowage index means mounted on said towing vehicle adjacent said tubular hitch receiver member;

a set of holes formed in said hitch receiver and ball mount member so that when assembled with said holes in alignment said receiver and ball mount assembly will engage said towing index means or said storage index means on the towing vehicle;

said towing and stowing index means being configured to engage with said ball mount member index engaging means when said ball mount member is telescopically inserted into said tubular hitch receiver and said set of holes in said hitch receiver and ball mount members are in alignment to hold said assembly in towing or storage condition.

6. The apparatus as claimed in claim 5 further including a linch pin inserted in said set of aligned holes in said hitch receiver and ball mount members to maintain said members in towing or stowed condition.

\* \* \* \* \*